US006419207B1

United States Patent

Barry et al.

(10) Patent No.: US 6,419,207 B1
(45) Date of Patent: Jul. 16, 2002

(54) VINYL BASE WALL CLAMP

(76) Inventors: Kevin J. Barry; Maurice L. Morison, both of HC 61 Box 353, Crow Wing, MN (US) 56444

(*) Notice: Subject to any disclaimer, the term of this patent is extended or adjusted under 35 U.S.C. 154(b) by 0 days.

(21) Appl. No.: 09/521,924

(22) Filed: Mar. 9, 2000

(51) Int. Cl.[7] .................................................... F16B 2/02

(52) U.S. Cl. .................... 254/209; 254/210; 248/229.1; 248/276.1

(58) Field of Search ........................... 156/71; 52/584.1, 52/749.1, 127.2; 254/209, 211, 210; 248/229.1–229.17, 229.2–229.26, 274.1, 276.1, 278.1, 279.1, 280.11, 283.1, 284.1, 285.1, 286.1, 287.1, 316.1

(56) References Cited

U.S. PATENT DOCUMENTS 797,245 A 8/1905 Wallum
3,524,623 A 8/1970 Campbell
3,747,157 A 7/1973 Szymanski
4,083,156 A * 4/1978 Tye ............................. 52/127
4,538,846 A * 9/1985 Alexander .................. 294/8.6
4,660,806 A 4/1987 Masters
5,176,387 A * 1/1993 Taggart ....................... 294/8.6
5,617,698 A * 4/1997 Guilmette .................. 52/749.1
5,683,526 A 11/1997 Guilmett et al.

* cited by examiner

*Primary Examiner*—Michael W. Ball
*Assistant Examiner*—Jessica Rossi
(74) *Attorney, Agent, or Firm*—Albert W. Watkins

(57) ABSTRACT

A pivoting force arm at one end presses against a vinyl baseboard. Various wall contours are addressed through various interchangeable wall heads which alternatively press against a straight wall portion, or inside or outside corner. The other end presses against flooring. Depending upon whether the flooring is smooth or carpeted, the appropriate head for engaging with the flooring will also be selected from two interchangeable heads. One head is designed for a smooth floor and the other for carpeting. The clamp allows vinyl base to be installed with adhesive, without the vinyl loosening or separating from the wall while the adhesive sets.

1 Claim, 5 Drawing Sheets

VINYL BASE WALL CLAMP

BACKGROUND OF THE INVENTION

1. Field of the Invention

This invention pertains generally to implements for applying a pushing force against a building component during adhesive bonding. In a more specific manifestation, the invention pertains to an implement for pushing vinyl base against a vertical wall until an adhesive sets.

2. Description of the Related Art

In any building, there are countless junctions between different surfaces. Floors and walls, windows and doors, and even carpet and vinyl flooring all exist side by side in a typical building. As is known in the construction trade, it is not economically practical to form perfect junctions between every one of these different surfaces. Instead, a low-cost trim or finish piece is applied to conceal imperfections. The trim improves appearance without requiring the time and expense that would be needed to craft a perfect junction. In many cases, the trim is also used to provide added functional benefits, beyond those attained in even a perfectly crafted junction.

For example, in both commercial and residential flooring, it is customary practice to provide finish or trim at the various junctions between different flooring, as well as at junctions between floor and wall. This trim frequently offers both decorative and functional benefit. One exemplary type of trim in common use is referred to in the trade as vinyl base, which is also known as vinyl baseboard or vinyl mop board. This vinyl base, as the name suggests, is applied at the base of a vertically extending wall surface. Base provides coverage of the junction between a floor surface and wall, and may be used to conceal the edge of many types of flooring. In addition to aesthetic benefits obtained by concealing the edges of the floor and wall, vinyl base also is relatively scratch, dent and scuff resistant, and so provides functional benefit by protecting an underlying surface against accidental damage. Water, detergent and solvent resistance are also characteristics, so activities such as carpet cleaning, hard floor mopping, and floor waxing or refinishing will not harm the vinyl base. As is known, many wall materials and coverings would be seriously harmed or destroyed by water, detergent and solvents. In the unlikely event a portion of vinyl base is accidentally destroyed, the vinyl base is also more readily patched or replaced than the underlying wall or floor. As should be apparent, the strictly aesthetic benefits of vinyl base can be less significant than the functional benefits.

Nevertheless, the benefits of vinyl base can only be obtained once the base is properly installed. In this matter of installation though, some of the earlier cited advantages of vinyl become disadvantageous. For example, solvent and moisture resistance translates to resistance to various glues and adhesives, and limited release of solvents used in the adhesives. Consequently, adhesives of choice in the industry today take a substantial amount of drying time before releasing enough solvent to keep the vinyl adhered to a surface. Further compounding the slow adhesion, vinyl base is frequently sold in rolls. Vinyl base is not inherently completely limp, but instead is somewhat resilient. Consequently, once rolled, the vinyl base will tend to take on the shape of the coil and may not conform immediately to a flat wall. Furthermore, flexing vinyl base about sharp corners while still maintaining adhesive contact between the base and wall can be very difficult.

Currently, when working with vinyl base, a worker will apply the base with adhesive and then subsequently check numerous times looking for sections that might not be properly adhered. Inside and outside comers can be particularly troublesome, and comers are also difficult to inspect and remedy. Between the extra labor incurred and the possibility for incomplete adhesion, a better method has been sought for installing vinyl base.

SUMMARY OF THE INVENTION

In a first manifestation, the invention is an implement for applying a pushing force between a floor covering and a wall covering. The implement includes a pedestal which engages the floor covering at a contact surface, resists relative motion therewith, and, when removed therefrom, leaves the contact surface unaltered. A first arm is flexibly coupled to the pedestal through a first connector, and extends along a first longitudinal axis. A second arm is flexibly coupled to the first arm through a second connector and extends along a second longitudinal axis. A head is flexibly coupled to the second arm through a third connector. The head engages the wall covering and resists relative motion therewith. When removed therefrom, the head leaves the wall covering unaltered. The pedestal, first arm, second arm and head rest entirely under the force of gravity when the first and second arms are not in a line, and apply a force between the pedestal and head transmitted through the first and second arms when the first and second arms are in line.

In a second manifestation, the invention is a method for installing vinyl base to a wall adjacent a juncture between a floor and said wall. The steps include applying adhesive to the wall or vinyl base; positioning the base adjacent the wall; applying a retaining force between the floor and vinyl base by forcing a clamp between.

In a third manifestation, the invention is a wall clamp, for pressing vinyl base and other material against a wall, which is particularly adapted to maintain a pressing force for extended duration. The clamp includes a means for releasably engaging a floor without damage; a means for releasably engaging a surface extending angularly from the floor without damage; and a means for releasably applying a pushing force against the floor engaging means and surface engaging means.

OBJECTS OF THE INVENTION

A first object of the invention is to provide an implement which will frictionally engage a horizontal surface and simultaneously press vinyl base against a vertical surface. A second object of the invention is to be able to provide the pressing force with a small and compact implement. A third object of the invention is to enable workers of all skill levels to quickly and safely apply the implement to a section of vinyl base. A further object of the invention is to adapt the implement to diverse floor surfaces. Another object of the invention is to adapt the implement to diverse wall contours. Yet a further object of the invention is to adapt the implement for additional applications requiring a simple and adaptable tool for applying a pushing force in a non-marring, non-destructive way. These and other objects of the invention are obtained in the preferred embodiment of the present invention, which will be best understood when considered in conjunction with the following text and illustrations.

DESCRIPTION OF THE PREFERRED EMBODIMENT

Figure 1:
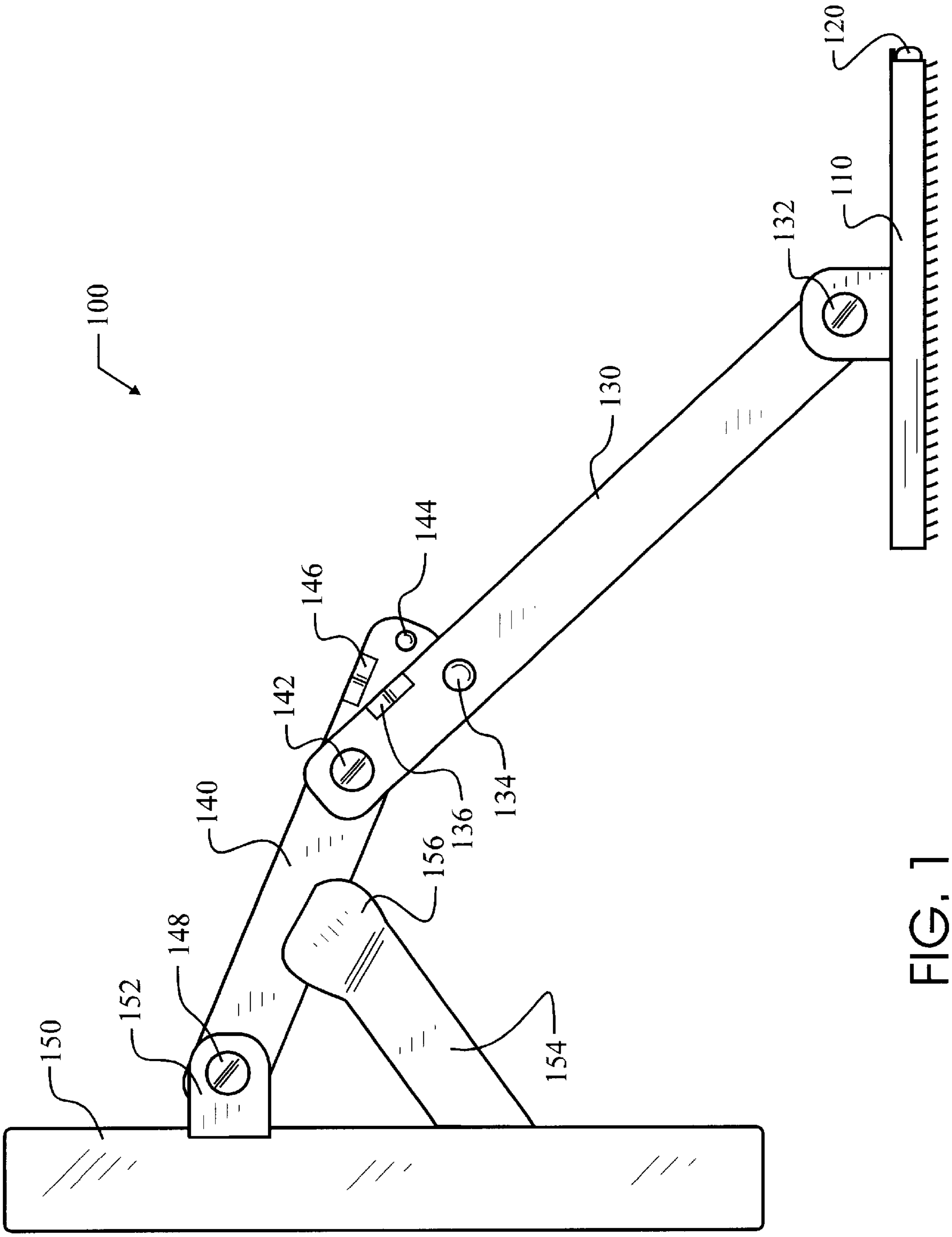
FIG. 1 illustrates the preferred embodiment base clamp from a side plan view showing the carpet pedestal and outside corner head.

A preferred embodiment base clamp 100 is illustrated in FIG. 1, and includes a base 110 with removable carpet attachment 120. A flexible coupling such as a rivet, bolt or other suitable fastener 132 attaches arm 130 to pedestal 110 and forms a first pivot point therewith. At an opposite end of arm 130 from fastener 132 a second pivot point is formed by fastener 142, which forms a rotatable junction between arm 130 and arm 140. Fastener 142 may be manufactured from the variety of fasteners as are known, similar to fastener 132. Arm 130 additionally includes large dimple 134, which is most preferably a round protrusion on one side of arm 130, and an indentation on the opposite side, such as might be formed by metal stamping. A v-shaped stop 136 is also most preferably formed by metal stamping. Arm 140 includes smaller dimple 144, which is designed to interact with larger dimple 134 to form a positive detent between arms 130 and 140 when the two arms are straightened so as to co-extend along the same longitudinal axis. To prevent arm 140 from rotating freely in both directions about arm 130, a v-shaped stop 146 is also stamped therein. V-shaped stop 146 will mate with v-shaped stop 136 and prevent rotation beyond co-axial in one direction of rotation, as is evident from the figure. At an end of arm 140 distal to arm 130 is another fastener 148, which connects arm 140 to head 150 through small u-shaped bracket 152. At a lower portion of head 150 is a yoke 154, having a y-shaped yoke top 156. When arms 130 and 140 are coaxial, y-shaped yoke top 156 will surround arm 140 and engage with it to provide further support.

During installation, a person will set pedestal 110 down onto a carpet surface, so that head 120 engages with the carpet. Head 150 will be pressed loosely against an outside corner of a wall, most preferably where a vinyl base has been installed. Base clamp 100 will be in a first position such as illustrated, for exemplary purposes, in FIG. 1. The person will then press down on either or both of arms 130 and 140, until small dimple 144 snaps into engagement with larger dimple 134, and stop 146, engages stop 136. In this second position, arms 130 and 140 will both extend longitudinally along parallel axes. The movement from first to second positions applies forces which increase the distance between fasteners 132 and 148. Yoke 154 will most preferably engage through yoke top 156 with arm 140, thereby ensuring the application of force against head 150 from two distant points at fastener 148 and yoke 154, to ensure adequate pressure across the entire surface of head 150.

Figure 2:
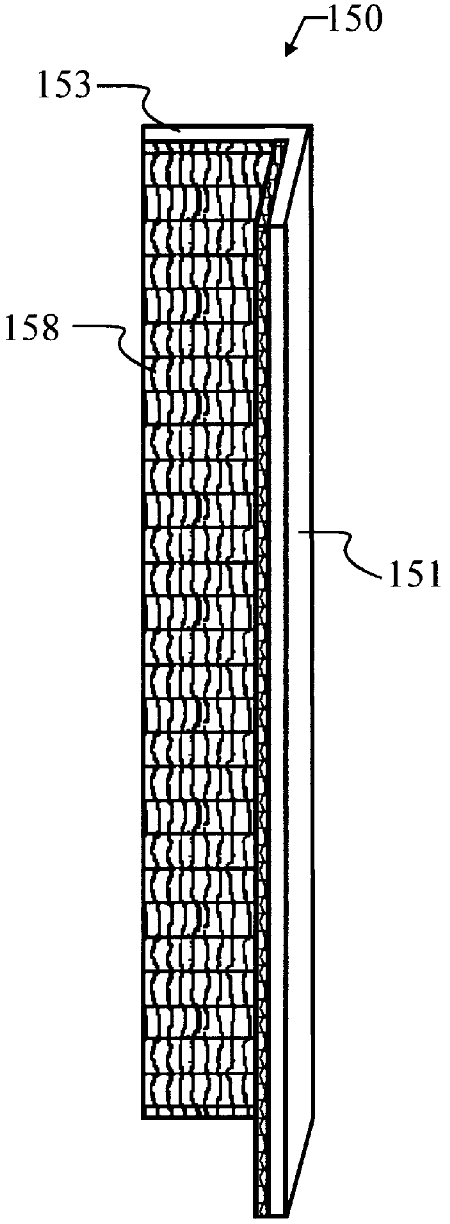
FIG. 2 illustrates the head of the preferred embodiment base clamp of FIG. 1 in greater detail, showing the compressible pad thereon.
Figure 5:
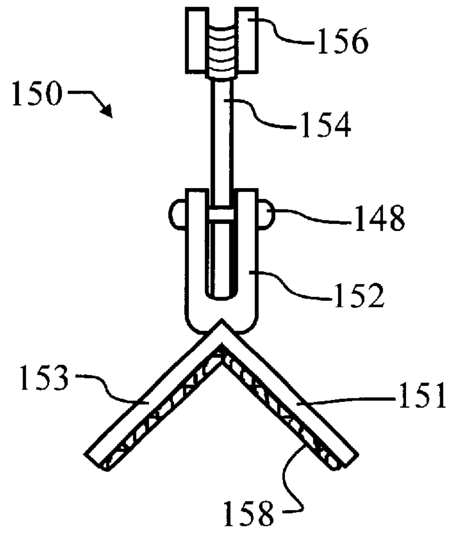
FIGS. 5–7 illustrate the outside, inside and flat heads respectively, each from top plan view.

FIGS. 2 and 5 illustrate head 150 in greater detail, including a v-shape formed from two angularly offset surfaces 151 and 153. As illustrated, the angle of offset between these surfaces 151, 153 is most preferably ninety degrees, though any suitable angle could be fabricated as desirable. A contact face of head 150 is most preferably covered by a relatively resilient and non-slip material such as polyurethane foam sprayed upon an open nylon or polyester web, commonly referred to as vinyl scrim. Other resilient materials would also be suitable, most preferably combining as many of the properties as possible found in the scrim, including resilience, non-marring and anti-slip properties. among other suitable materials are foam rubber and synthetic materials, ow-durometer rubbers and synthetics, and other such materials. Less preferably, head 150 may be left uncovered or alternatively covered with a more rigid or slippery material.

Figure 3:
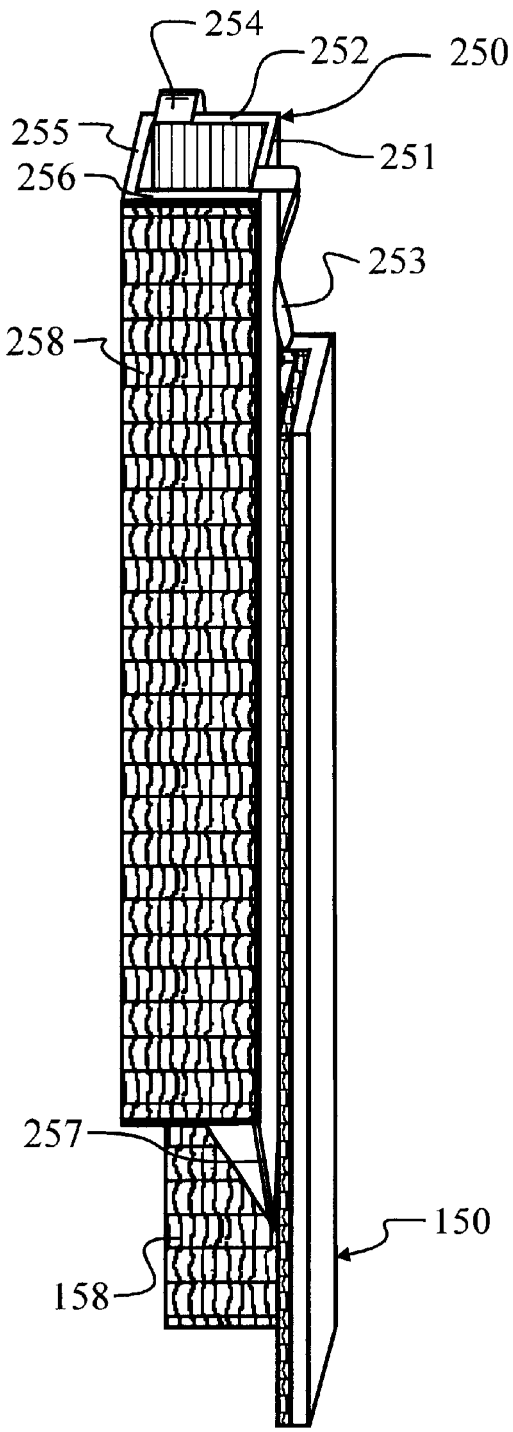
FIG. 3 illustrates the installation of an inside corner attachment to the head of FIG. 2.
Figure 6:
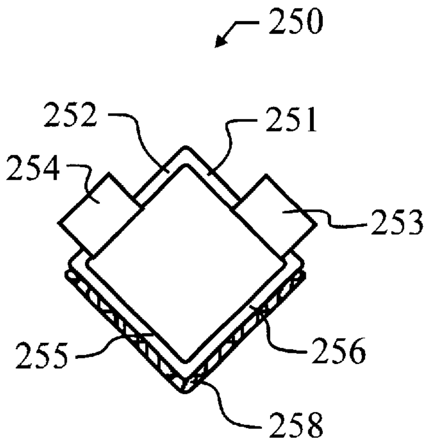

FIG. 3 illustrates an attachment head 250, partially slid into engagement with head 150, which is designed for inside comers, and FIG. 6 illustrates head 250 form a top plan view. Head 250 includes four walls 251, 252, 255 and 256. Walls 251 and 252 will engage with walls 151 and 153 during use, and walls 255 and 256 will be the hard surfaces which transmit force into the inside comer of a wall or vinyl base. Most preferably, head 250 will also include a resilient, non-marring and anti-slip material 258 similar to vinyl scrim 158. To help with the engagement between head 150 and head 250, a pair of clips 253, 254 are provided. These will most preferably be a springy, somewhat rigid material such as a spring or stainless steel, phosphor bronze, beryllium copper, polymeric material, or other suitable material as will be apparent to those skilled in the art.

Figure 4:
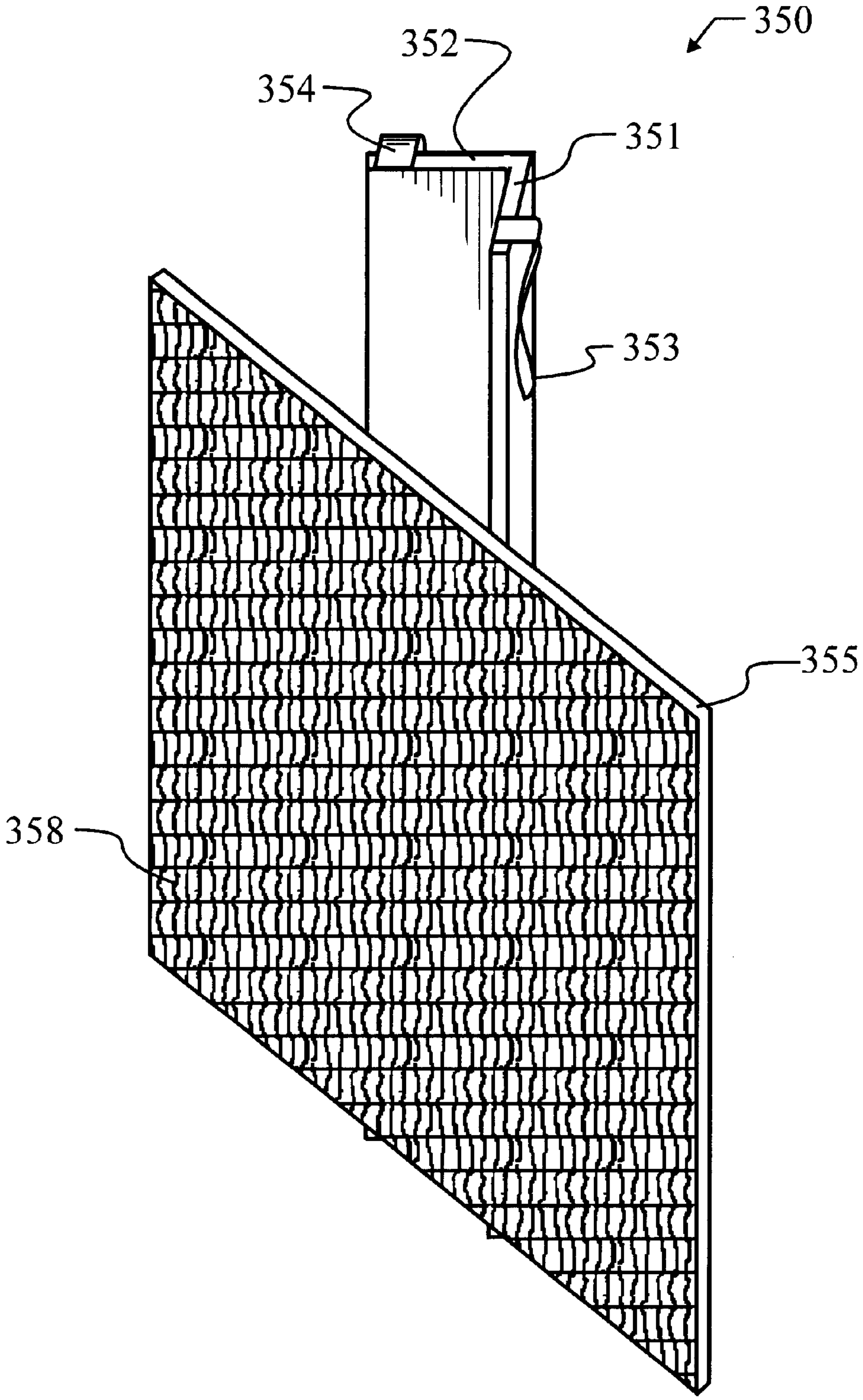
FIG. 4 illustrates a flat attachment which can be added to the head of FIG. 2.
Figure 7:
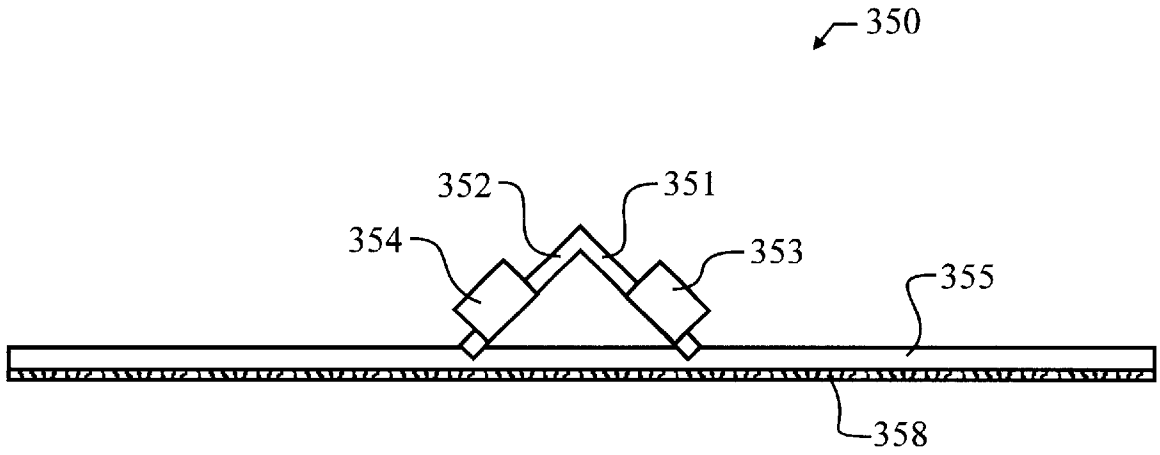

FIGS. 4 and 7 illustrate attachment head 350, which, similar to head 250, may be slid into engagement with head 150. Head 350 is for application to flat surfaces, and has particularly preferred utility where long straight runs of vinyl base are to be installed. As aforementioned, along these long straight runs, it is probable that the vinyl will attempt to coil back up and will separate from the wall before the adhesive dries. Using head 350 in combination with clamp 100, the vinyl base can be held tightly against the wall. While head 350 is similar to head 250, a flat force surface 355 is provided to work in association with resilient pad 358 as the force applying surface. Clips 353, 354 and faces 351, 352 are otherwise comparable to the counterparts in head 250.

Figure 8:
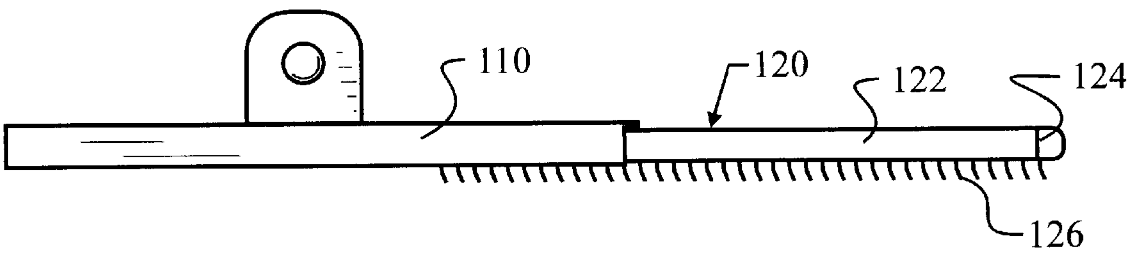
FIG. 8 illustrates the pedestal of the preferred embodiment base clamp of FIG. 1 in greater detail, showing the carpet attachment partially removed.

FIG. 8 illustrates pedestal 110 with carpet attachment 120 partially removed. Carpet attachment may be attached to pedestal 110 in any number of ways, but is most preferably slid into engagement such that a wide area 124 rests against and acts as a stop with pedestal 110. A large number of teeth 126 in the shape of large diameter wires or nails extend down so as to dig into the pile of a carpet to form a firm but non-damaging and easily removable engagement therewith.

Figure 9:
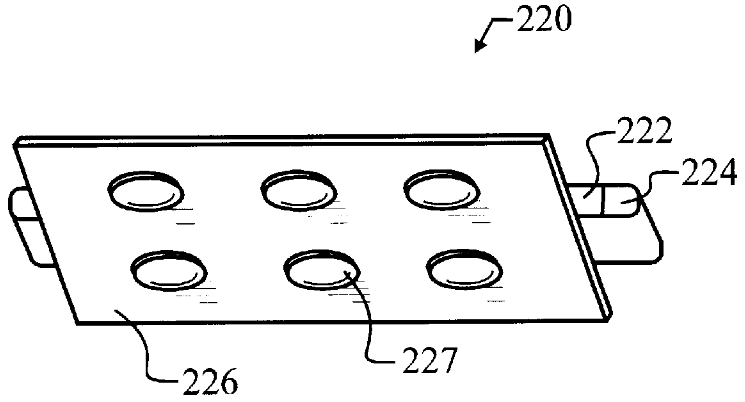
FIG. 9 illustrates a preferred embodiment hard floor attachment which can be substituted for the carpet attachment of FIG. 8.

As can be seen in FIG. 9, an alternative attachment 220 is useful for hard or resilient floors such as sheet or tiled vinyl, hardwood, ceramic tile, or other such surface where attachment 120 would otherwise be unsuitable. Alternative attachment 220 includes the same rail 222 which will slide into pedestal 110, and an enlarged head 224 which will act as a stop. However, instead of a set of small thin points extending down, a rubber or similar resilient base 226 will most preferably include suction cups 227 thereon. Any other suitable material can be used. Once again, the most preferred properties are that the material be non-slip, non-marring, and most preferably somewhat resilient. Suction cups 227 provide these characteristics admirably, while vinyl scrim will also work. The idea features a pivoting force arm that at one end will press against a vinyl baseboard. either at a straight wall portion or on an inside or outside corner. The other end as two interchangeable heads, one designed for a hard floor and the other for carpeting. The clamp allows vinyl base to be installed with adhesive, without the vinyl loosening or separating from the wall.

While the foregoing details what is felt to be the preferred embodiment of the invention, no material limitations to the scope of the claimed invention are intended. Further, features and design alternatives that would be obvious to one of ordinary skill in the art are considered to be incorporated herein. For example, while the most preferred embodiment has numerous structural components that are preferably formed from stamped metal such as steel, the materials may include various metals, plastics, etc. The invention is not limited to a particular material or method of fabrication. The scope of the invention is set forth and particularly described in the claims hereinbelow.

We claim:

1. An implement for applying a pushing force between a floor covering and a wall covering to press said wall covering against a wall, comprising:

a pedestal which engages said floor covering at a contact surface, resists relative motion therewith, and, when removed therefrom, leaves said contact surface of said floor covering unaltered;

a first arm pivotally coupled to said pedestal through a first connector and extending therefrom along a first longitudinal axis;

a second arm pivotally coupled to said first arm through a second connector and extending therefrom along a second longitudinal axis;

a head pivotally coupled to said second arm through a third connector which engages said wall covering, resists relative motion therewith, and, when removed therefrom, leaves a surface of said wall covering unaltered;

said first and second arms angularly pivotal relative to each other between a first position wherein said first and second longitudinal axes are not parallel and a second position wherein said first and second longitudinal axes are parallel which applies forces requiring greater separation between said first connector and said third connector than when in said first position, said head operatively anchored relative to said wall covering and said pedestal operatively anchored relative to said floor covering while pivoting between said first and second positions; and mating dimples to retain said first and second arms parallel.

* * * * *